June 17, 1958 D. W. EPSTEIN 2,839,599

MONOCHROME OR COLOR TELEVISION IMAGE DISPLAY SYSTEMS

Filed May 28, 1954 3 Sheets-Sheet 1

INVENTOR.
DAVID W. EPSTEIN
BY
Attorney

June 17, 1958 D. W. EPSTEIN 2,839,599

MONOCHROME OR COLOR TELEVISION IMAGE DISPLAY SYSTEMS

Filed May 28, 1954

3 Sheets-Sheet 2

INVENTOR.
DAVID W. EPSTEIN
BY
[signature]
ATTORNEY

INVENTOR.
DAVID W. EPSTEIN
BY [signature]
ATTORNEY

United States Patent Office 2,839,599

Patented June 17, 1958

2,839,599

MONOCHROME OR COLOR TELEVISION IMAGE DISPLAY SYSTEMS

David W. Epstein, Princeton, N. J., assignor to Radio Corporation of America, a corporation of Delaware Application May 28, 1954, Serial No. 432,968

3 Claims. (Cl. 178—5.4)

This invention relates to image reproduction systems and more particularly to projection systems for color television.

There are several well known systems for the reproduction of images containing a plurality of selected color components by using a plurality of image reproducing means. For color television a plurality of kinescopes, each forming an image in terms of one of the selected color components on its face, is often used. Each of the kinescopes has an end or face plate on which numerous dots or areas of a phosphorescent material are deposited. Each phosphorescent material emits light of one of the color components upon bombardment by an intensity modulated electron beam. The kinescopes may be arranged in a triangular cluster as shown in my Patent No. 2,549,585 issued on April 17, 1951, and entitled "Multiple Television Projectors." Another common form is the "in-line" arrangement wherein each of the kinescopes is placed in a line or row. Still another arrangement as shown in my Patent No. 2,590,240 issued on March 25, 1952, and entitled "Multiple Image Projector" is one in which the kinescopes are placed in a T-formation and interleaved dichroics are so positioned in front of the kinescope faces that a multicolored image is produced.

The present invention is a simple method of producing monochromatic images in image production apparatus employing a plurality of display means. If a plurality of kinescopes is used as the plurality of display means, for example, and each kinescope is to produce an image in terms of one of the selected color components, at least one of the kinescopes is of the conventional black-and-white type. In front of this black-and-white kinescope a colored transmission filter is switchably positioned so that if a multicolored image is desired, the other kinescopes having color emitting phosphors and the conventional kinescope with the filter are operated simultaneously. In the event that black-and white images are desired the kinescopes with the color emitting phosphors are inactivated and the filter is removed from in front of the black-and-white kinescope. In one form of the invention the filter is preferably mounted in front of the kinescope which is to receive the signals corresponding to the green components of the televised image. The filter may be moved simultaneously with the inactivation of the other kinescopes in response to a manual control, or to an automatic control actuated by a particular transmitted signal. The transmitted signal may be, for example, the color demodulation synchronizing signal prescribed by the FCC standards for U. S. broadcast color television.

It is therefore an object of the present invention to obtain an improved black-and-white image from apparatus which contains a plurality of image reproducing means.

A further object is to provide an improved color and monochromatic television projection system in which better light distribution over the field is accomplished.

Another object is to provide a system for overcoming misregistration in color television projection systems which are to be used also for monochromatic presentation.

Other objects and features of the invention as well as a more complete understanding of its nature will be readily apparent by reading the following description in conjunction with the accompanying drawings in which.

Figure 1:
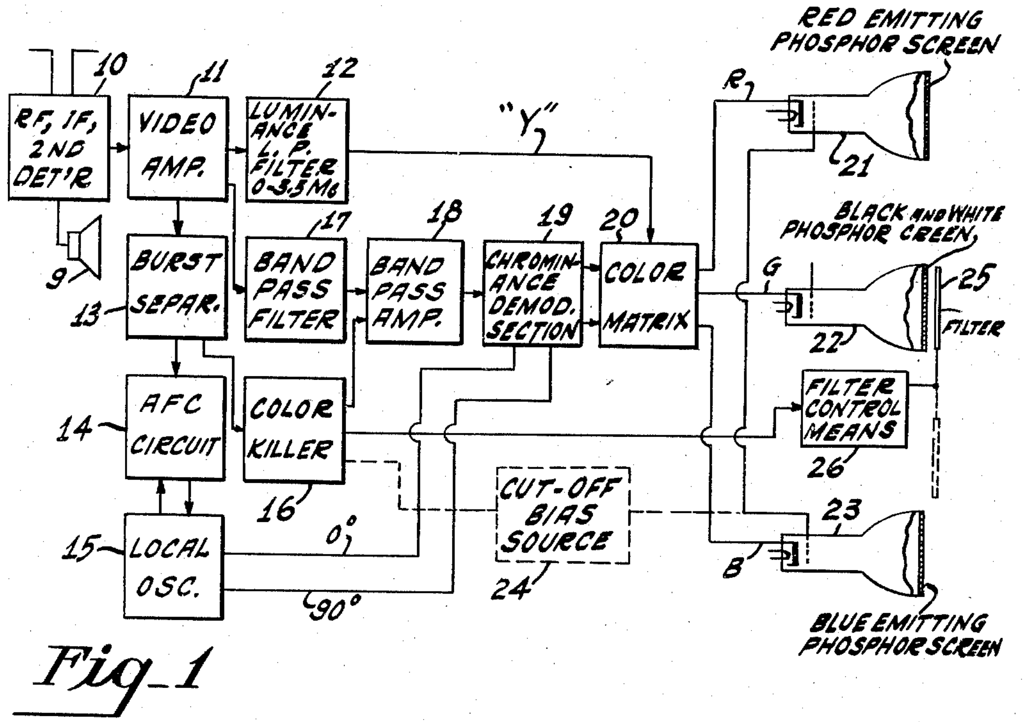
Figure 1 is a block diagram of one form of the present invention.

Referring in detail to Figure 1, there is shown a color television system using the present invention in conjunction with a color television receiver of the type which translates standard color television signals into monochromatic or multichromatic images as the case may be. The embodiment of Figure 1 encompasses only the outlines of a color television receiving apparatus and does not include details of power supply, synchronization deflection circuits, or other details which are not necessary for a proper understanding of the invention. The invention is of great utility when used with color television projection systems, but it is to be understood as also covering systems in which the recreated images produced by each display means are fused into a single monochromatic image.

The R. F., I. F., and second detector stages of a color television receiver are shown in block 10 whose output is applied to a video amplifier 11 and sound reproducer 9. Details concerning these elements are well shown and described in a paper by Antony Wright entitled "Television receivers" published in the RCA Review for March 1949. A portion of the output of amplifier 11 is fed to luminance low-pass filter 12 which attenuates frequencies in the vicinity of 3.58 megacycles. The signal in the output of low-pass filter 12 is applied to color matrix 20 where it is added to other components of the composite color signal as will be explained below.

Another portion of the output of video amplifier 11 is applied to band-pass filter 17 which allows frequencies from 2 to 4 megacycles to be applied to band-pass amplifier 18. The chrominance components, from the output of amplifier 18 known as the "I" and "Q" components, are demodulated by chrominance demodulation section 19 and are applied to two other inputs of color matrix 20. In matrix 20 the Y, I and Q signals are so combined that the original voltage waves corresponding to the plurality of selected color components are derived and applied to display means 21, 22, and 23 respectively. One of the display means may be a conventional black-and-white kinescope. Assuming that display means 22 is the latter, it is seen that a green transmitting filter 25 is positioned in front of its face plate 26. Display means 21 and 23 which may be kinescopes, for example, may have red and blue emitting phosphor plates respectively thus obviating the need for any special filter means. Details concerning the chrominance demodulating section 19 are well shown and described in an article entitled "Color television signal receiver demodulators" by Pritchard and Rhodes published in the RCA Review for June 1953. A third portion of the output of video amplifier 11 is applied to a color synchronizing burst separator 13. The separated burst is applied to one input of AFC circuit 14, and to another input of the circuit 14 oscillations from local oscillator 15 are applied. Should there be a departure from a predetermined phase relation between the separated burst and the local oscillations, an error voltage is produced which is fed back from the AFC circuit 14 to local oscillator 15 so as to bring the latter into the proper phase relationship. The oscillations from oscillator 15 are also applied in quadrature phases, 0° and 90°, to demodulation section 19 where synchronous demodulation of the output of amplifier 18 then takes place at the two different phase angles of the locally generated oscillatory wave. Further details of the operating standards promulgated by the FCC may be found in FCC Public Notice No. 53–1663 which was adopted on December 17, 1953.

In the event that color signals are not transmitted there will not be any burst appearing on the horizontal blanking pulse back porch. Therefore no input to "color killer" 16 from burst separator 13 will be furnished. Color killer 16 thereupon biases off band-pass amplifier 18 so that the output of filter 17 is prevented from reaching the demodulation section 19. A typical color killer is explained and shown in a circuit diagram appearing in "Practical Color Television for the Service Industry" published by RCA Service Co. at pages 26 and 27 and elsewhere therein. In accordance with this invention the color killer 16 also provides a signal for accomplishing two other operations. First, it actuates a filter control means 26 which removes filter 25 from in front of the end or face plate of kinescope 22 to the position shown by the dotted lines. Second, it furnishes a signal, either directly or indirectly, which operates to cut off effectively the red and blue emitting kinescopes 21 and 23 respectively. The color killer 16 accordingly may furnish, in the form of the invention shown in Figure 1, a negative voltage to a control electrode of each of the kinescopes 21 and 23. Should the voltage provided by the color killer 16 be insufficient to completely cut off those kinescopes, it may be first applied to a special cutoff bias source 24 shown in a dashed line box which in turn develops the requisite voltages, having the proper amplitude to blank kinescopes 21 and 23. Of course, instead of a negative grid voltage applied on the control grid or other electrode, the cathode may be driven positive to accomplish the same purpose.

The filter control means 26 may take the form of a variety of electro-mechanical means for placing the green filter 25 either in front of or away from kinescope 22. Similarly, many alternative methods are possible by which the presence or absence of a particular signal in the incoming wave may be used to cut off kinescopes 21 and 23 from contributing to the projected image when monochrome signals are received.

Figure 2:
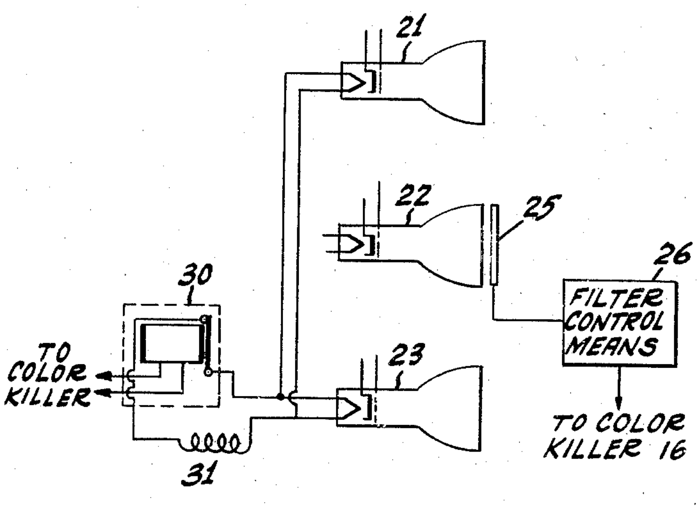
Figure 2 is a schematic and block diagram showing another form of the invention.

One simple alternative which may prove advantageous is the arrangement shown in Figure 2. In this case, the input to the kinescopes 21, 22, and 23 is applied to the cathode. If the cathodes of kinescopes 21 and 23 can be de-energized by interrupting the supply of filament current thereto, no light output will result from these tubes. Therefore, the color killer 16 is coupled to a relay 30 which may be, for example, normally closed when burst is received so that the filament transformer winding 31 supplies the power for the operation of each kinescope. In the event that burst is not received the color killer may develop so little voltage that the relay 30 opens cutting off the filament supply to kinescopes 21 and 23. This arrangement is relatively simple and inexpensive and may contribute to improvement of efficiency in the overall system since no power is required to drive the blanked out kinescopes during intervals of monochromatic reception. Similarly there is no need for a special cutoff bias source 24 which may be necessary in the preceding case inasmuch as the particular operating bias applied to each of the kinescopes will differ under normal operating conditions.

Figures 3, 4, 5:
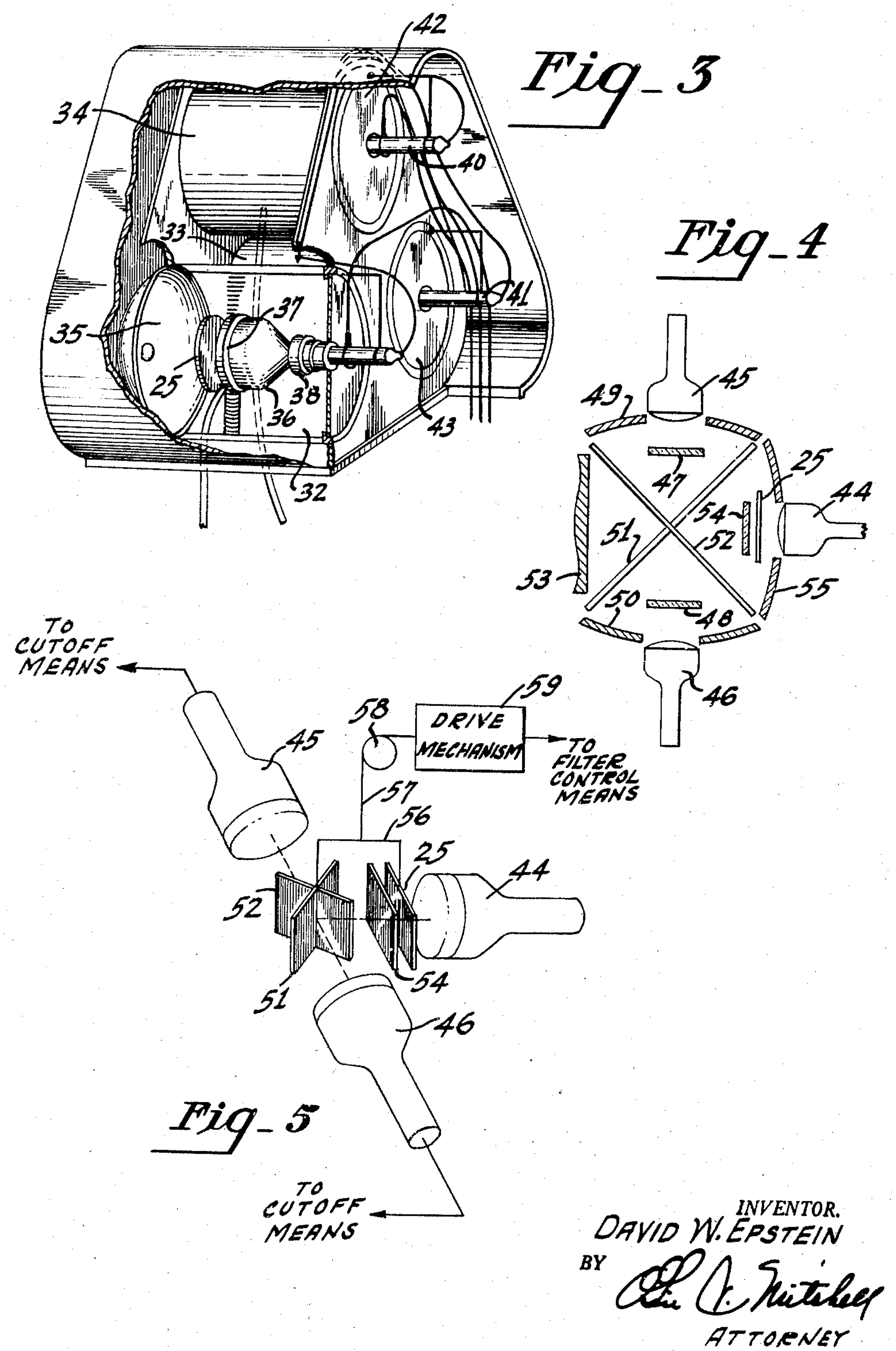
Figure 3 is a perspective and partially sectional view of the invention in another form.
Figure 4 is a schematic representation of the invention as embodied in a projection system using a single correction plate.
Figure 5 is a perspective view of the invention as it would be incorporated in the apparatus of Figure 4.

The particular form or arrangement of the display tubes or kinescope may, of course, vary according to the type of projector employed. Figure 3 shows how the invention might be used in a triangular cluster type of projection system. In this system a uni-reflective concave type of optical arrangement is used. Each of the barrels 32, 33, and 34 contain similar components which will now be explained. Since barrel 32 has been cut away, it will be more easily understood as the prototype of barrels 33 and 34. A concave mirror 35 is located at one end of the barrel facing the end plate of kinescope 36. Kinescope 36 is supported near its face plate by collar 37 and near its neck by the mounting apparatus 38 which is located in the center of correction plate 39. Assuming that kinescope 36 is to be a black-and-white kinescope, a green filter 25 is positioned intermediate the face plate and the concave mirror 35. Of course, the barrels 33 and 34 will not contain the filter 25 and their respective kinescopes 40 and 41, the tips of which are shown protruding through the respective correcting plates 42 and 43, will have phosphor screens which are red and blue emitting respectively. The position of the filter in case of monochromatic signal reception is shown in dashed lines. As stated above, the particular electrical or mechanical means for positioning it may take a variety of optional forms. The filter may also be located between the correcting plate 39 and the viewing surface if desired.

The use of the invention in the triangular cluster type of projection system is approximately the same for the so-called "in-line" arrangement in which the three barrels would be positioned within a single plane. Since the adaptation is obvious no further details will be given here.

Figure 4 shows an arrangement in which the invention is used in connection with a T-structure such as is described in detail in my Patent No. 2,590,240, mentioned above. The significant difference is that instead of using three kinescopes having phosphor screens, each adapted to produce differently colored images by electron bombardment of different color-emitting phosphor screens, only two of them are so constructed, whereas the third is a conventional monochromatic or black-and-white kinescope. A filter 25 to convert the monochromatic image into one tinted green is disposed in proximity to the face plate of the conventional kinescope. In Figure 4 two of the kinescopes 45 and 46 each have phosphor screens which emit red and blue respectively. In front of these two kinescopes two plane mirrors 47 and 48 are located so that the tinted images appearing on the face plates of kinescopes 45 and 46 are reflected onto the reflective inner surface of concave mirrors 49 and 50. The mirrors 49 and 50 then reflect the image onto the interleaved dichloric mirrors 51 and 52 which again reflect the images through a common correcting lens 53. Dichroic mirror 51 is so constructed that it reflects the red image which has been reflected upon concave mirror 49 through the correcting lens 53. When color images are projected, conventional kinescope 44 throws an image on plane mirror 54 through green filter 25 which in turn reflects it onto the reflecting surface of concave mirror 55. The latter then projects the image through the interleaved dichroic mirrors 51 and 52 and through the correcting lens 53 onto the viewing surface (not shown).

Figure 5 shows how a simple mechanical system may be employed with the system shown in Figure 4 to effectuate the removal of the interleaved dichroic mirrors 51 and 52 and the green filter 25 from in front of the kinescope 44. The correcting lens 53 and the plane mirrors 47 and 48 have been omitted to show the operation of the invention more clearly in this figure. The interleaved dichroic mirrors 51 and 52 and the green filter are suspended from a common member 56 which itself is hoisted by pulling a rope or chain 57 around a pulley 58. The end of the rope or chain is coupled to a drive mechanism 59 which is in turn coupled to a filter control device such as the one shown in Figure 1. As in the previous embodiments, the inputs to the kinescopes 45 and 46 may be cut off by appropriate means analogous to arrangements mentioned in connection with Figures 1 and 2.

Figure 6:
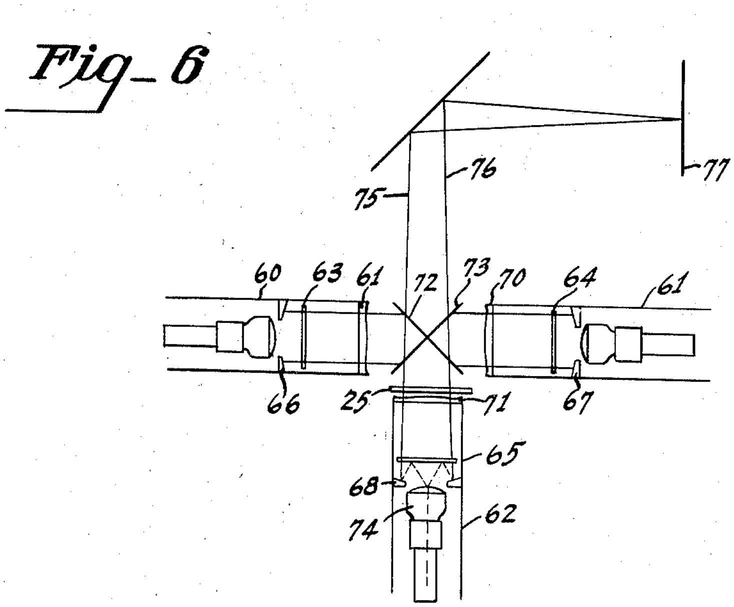
Figure 6 is a schematic diagram of another form of the invention.

It is apparent that this hoist arrangement may be used with a bi-reflective optical system of the type illustrated in Figure 6. In this embodiment there is no common correcting plate or lens 53 as shown in Figure 4. Each of the barrels 60, 61, and 62 contains an individual Schmidt type bi-reflective optical system consisting of a plane mirror 63, 64, or 65, a spherical mirror 66, 67, or 68, and a correcting plate 61, 70, or 71. In addition the customary interleaved dichroic filters 72 and 73 are used and a green transmission filter 25 is placed in front of the correcting plate 71 when colored images are desired. If this type of T-structure is mounted so that the output rays 75 and 76 are vertical and the viewing screen 77 is also vertical, the mechanical arrangement for withdrawing the interleaved dichroic filters 72 and 73 and green filter 25 will be different since they will be moved in a horizontal direction. However, no particular problem is here presented since there are many well known mechanical devices which can be employed to this end. Whether the T-structure of this figure or of Figure 4 is mounted horizontally or vertically is unimportant insofar as it relates to this invention.

Figure 7:
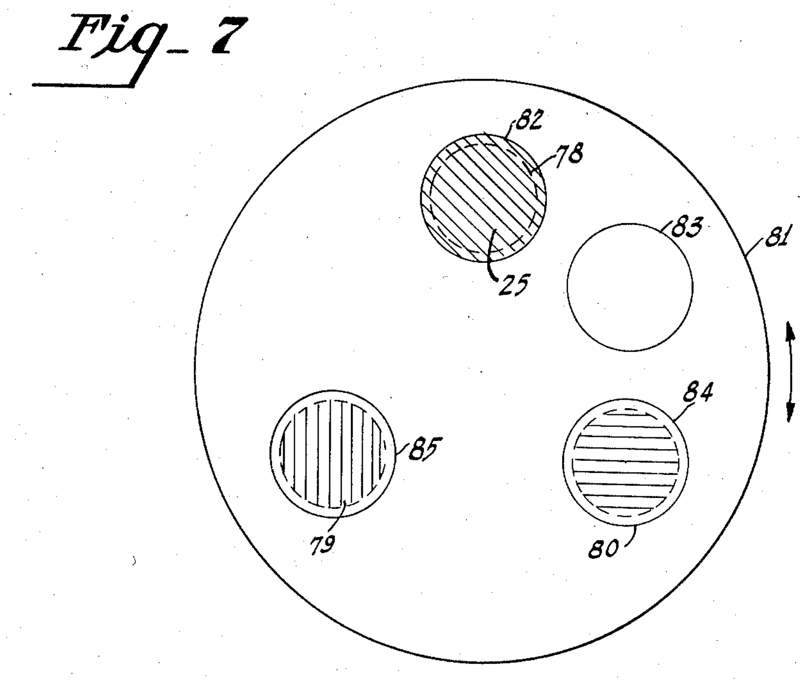
Figure 7 shows how the invention may be accomplished with a movable filter disc.

Another simple arrangement which can be devised to utilize the principles of the invention is pictured in Figure 7. It assumes that the face plates (shown by dashed line circles) 78, 79, and 80 of monochrome, red and blue kinescopes, respectively, are mounted in the triangular cluster disposition. An opaque disc 81, containing at least four circular apertures 82, 83, 84, and 85, is positioned in front of the kinescope face plates 78, 79, and 80. When color images are desired, the disc 81 is positioned as shown so that a green filter 25 in aperture 82 is in front of the monochrome kinescope face plate 78, and unfilled apertures 85 and 84 are in front of the red phosphor kinescope face plate and blue phosphor kinescope face plate respectively. When monochrome signals are received, the filter 81 is shifted counterclockwise so that unfilled aperture 83 is in front of monochrome kinescope face plate, and opaque sections of the filter 81 are shifted in front of red and blue kinescope face plates, cutting off their light from reaching the viewing surface. It is obvious that a similar arrangement may be used with the in-line set up wherein the filter would be of essentially rectangular form and could be moved laterally in front of the three kinescope faces or could be moved in a direction perpendicular to the direction toward which the kinescope faces are pointed. Appropriate mechanical systems can be coupled to the filter disc 81 shown in Figure 7, or to analogous filter systems mentioned for use with the in-line type of projection system.

Throughout this application the filter in front of the monochromatic image producing means has been treated as being something solid which requires movement to inactivate it when a monochromatic image is to be projected. It is to be understood, however, that other types of filters may be used which can be placed fixedly in front of the monochromatic display means, and which can be electronically activated or de-activated for transmitting only a particular color or light of all colors as the case may be. Such filters have been described in the copending application of J. Kurshan, Serial No. 365,339, filed July 1, 1953, and entitled "Color Television System." Another such filter may be found in a patent issued to G. C. Sziklai on March 17, 1953, and entitled "Electrochemical Color Filter."

It is thus seen that the invention avoids some of the problems of misregistration, vignetting and unbalance of light produced by the non-linearity inherent in projection systems using two or more display means to form a monochrome image. It is to be understood that the invention is equally applicable to projection systems in which two colors are used to form the composite color images as well as the three color types herein described. By inactivating one or more of the display means when monochrome is to be shown, the system additionally possesses the advantage of greater efficiency.

Having thus described the invention, what is claimed is:

1. A bi-reflective image projection system for use with television systems in which monochromatic or color signals appear comprising, a plurality of bi-reflective optical units each of which contains an image producing means, a plane mirror, a concave mirror, and a correcting lens, said plane mirror adapted to reflect the image of its corresponding image producing means onto said concave mirror, said concave mirror adapted to reflect the image reflected by said plane mirror onto it through said correcting lens, a pair of interleaved dichroic mirrors located in the optical path of each of said correcting lenses, one of said image producing means adapted to produce a monochromatic image, a filter positioned in front of said last-named image producing means for passing light from said monochromatic image corresponding to one of a set of primary color components of a televised object when said color television signals appear, the others of said plurality of image producing means being adapted to simultaneously produce images corresponding to others of said set of primary color components when said color television signals appear, each of the images of said plurality of image producing means thereupon forming an output image which is a composite colored image, means coupled to said television system for rendering said filter ineffective when said monochrome signals appear, means for preventing said other image producing means from cooperating to produce an output image when said monochrome signals appear, and means coupled to said television system for removing said interleaved dichroic mirrors from the optical path of said monochromatic image producing means when said monochrome signals appear in said system, the image produced by said monochromatic image producing means thereupon solely producing an output image.

2. A projection system for use in a television system in which monochromatic or color television signals appear comprising, a plurality of image producing means, one of said image producing means producing a monochromatic image, the others of said plurality of image producing means producing tinted images when said color television signals appear, each of said tinted images corresponding to selected color components of a televised object, a movable filter assembly positioned in proximity to said image producing means, said filter assembly having a section which transmits light of another of said selected color components, said section being positioned in front of said monochromatic image producing means when said color television signals appear, said filter assembly containing a number of substantially transparent sections, some of which are located in front of said other image producing means when said color television signals appear, said filter assembly being adapted to be moved in a fashion such that said other image producing means are blocked off by opaque sections of said filter assembly and such that one of said transparent sections is positioned in front of said monochromatic image producing means when monochromatic television signals appear in said system.

3. A projection system for use in television apparatus for receiving monochromatic or color television signals comprising, a plurality of image producing means one of which produces a monochromatic image, the others of said image producing means producing tinted images corresponding to respective selected color components of a televised object, said monochromatic image producing means producing a monochromatic image representative of another selected color component of said televised object when color television signals are received, a plurality of plane reflecting means each of which is positioned before a corresponding one of said image producing means, a plurality of concave reflecting means having a central portion through which light from a corresponding one of said image producing means can pass, each of said plane reflecting means being adapted to reflect light from its corresponding image producing means onto a corresponding one of said concave reflecting means, a pair of interleaved dichroic mirrors each of which is adapted to reflect substantially only light of the color of a corresponding one of said tinted images and to transmit light of all other colors, said concave mirrors each being adapted to reflect the light of one of said tinted images which have been reflected onto them by one of said corresponding plane reflecting means onto a corresponding one of said dichroic mirrors, transmission filter means positioned near said monochromatic image producing means for passing light from said monochromatic image corresponding to another of said selected color components when color television signals are received, optical correcting means positioned in the common optical path of all of said image producing means adapted to transmit light from said tinted images and said filtered monochromatic image when color television signals are received, means coupled to said receiving apparatus for removing said interleaved dichroic mirrors from the optical path of all of said image producing means when monochromatic signals are received, means coupled to said apparatus for inactivating said transmitting filter so that the image produced by said monochromatic image producing means is reflected by its associated plane and concave reflecting means substantially unmodified through said optical correcting means when monochromatic television signals are received, and means coupled to said apparatus for cutting off said tinted image producing means when monochromatic images are received.

References Cited in the file of this patent

UNITED STATES PATENTS

| | | |
|---|---|---|
| 2,466,021 | Goldmark | Apr. 5, 1949 |
| 2,549,585 | Epstein | Apr. 17, 1951 |
| 2,803,698 | De Vrijer | Aug. 20, 1957 |